US011936123B2

(12) United States Patent
Arai

(10) Patent No.: US 11,936,123 B2
(45) Date of Patent: Mar. 19, 2024

(54) SUB-ARRAY ANTENNA, ARRAY ANTENNA, ANTENNA MODULE, AND COMMUNICATION DEVICE

(71) Applicant: Murata Manufacturing Co., Ltd., Nagaokakyo (JP)

(72) Inventor: Kota Arai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 201 days.

(21) Appl. No.: 17/536,115

(22) Filed: Nov. 29, 2021

(65) Prior Publication Data

US 2022/0085502 A1 Mar. 17, 2022

Related U.S. Application Data

(63) Continuation of application No. PCT/JP2020/019205, filed on May 14, 2020.

(30) Foreign Application Priority Data

May 31, 2019 (JP) ................................. 2019-102041

(51) Int. Cl.
*H01Q 21/06* (2006.01)
*H01Q 9/04* (2006.01)

(52) U.S. Cl.
CPC ......... *H01Q 9/0435* (2013.01); *H01Q 21/065* (2013.01)

(58) Field of Classification Search
CPC ............... H01Q 9/0428; H01Q 9/0435; H01Q 21/0025; H01Q 21/065
See application file for complete search history.

(56) References Cited

U.S. PATENT DOCUMENTS 6,496,158 B1 12/2002 Ksienski et al.
10,714,840 B1 * 7/2020 West ...................... H01Q 21/30
(Continued)

FOREIGN PATENT DOCUMENTS

JP 2001-7628 A 1/2001
JP 2005-86603 A 3/2005
(Continued)

OTHER PUBLICATIONS

Office Action dated Aug. 1, 2023 in Chinese Patent Application No. 202080054902.7, 13 pages.
(Continued)

*Primary Examiner* — Daniel Munoz
(74) *Attorney, Agent, or Firm* — XSENSUS LLP

(57) ABSTRACT

An antenna module includes a main substrate and a plurality of sub-array antennas. Each sub-array antenna includes a sub-substrate and a plurality of antenna elements. Each antenna element includes a parasitic element arranged on an upper surface of the sub-substrate, and a feeding element arranged in a layer between the upper surface and a lower surface of the sub-substrate. When a wavelength of a radio wave in free space is λ, a distance between a plane center of the antenna element arranged at a position adjacent to an end surface of the sub-substrate and the end surface is equal to or greater than λ/9, and equal to or less than half a distance (P) between respective centers of two of the antenna elements adjacent to each other in each sub-array antenna.

16 Claims, 14 Drawing Sheets

(56) References Cited

U.S. PATENT DOCUMENTS

| | | | | |
|---|---|---|---|---|
| 2016/0285172 | A1 | 9/2016 | Kishigami et al. | |
| 2019/0081414 | A1* | 3/2019 | Kao | H01Q 5/15 |

FOREIGN PATENT DOCUMENTS

| | | | |
|---|---|---|---|
| JP | 2007-312082 | A | 11/2007 |
| JP | 2014-179985 | A | 9/2014 |
| JP | 2016-180720 | A | 10/2016 |
| JP | 2016-213927 | A | 12/2016 |
| KR | 2014-0112446 | A | 9/2014 |
| WO | 2016/067906 | A1 | 5/2016 |

OTHER PUBLICATIONS

Office Action dated Oct. 12, 2022, in corresponding Korean patent Application No. 10-2021-7038424, 4 pages.

International Search Report and Written Opinion dated Aug. 18, 2020, received for PCT Application PCT/JP2020/019205, Filed on May 14, 2020, 10 pages including English Translation.

* cited by examiner

SUB-ARRAY ANTENNA, ARRAY ANTENNA, ANTENNA MODULE, AND COMMUNICATION DEVICE

CROSS-REFERENCE TO RELATED APPLICATION

The present application claims priority to Japanese patent application JP 2019-102041, filed May 31, 2019, and PCT/JP2020/019205, filed May 14, 2020, the entire contents of each of which being incorporated herein by reference.

TECHNICAL FIELD

The present disclosure relates to an antenna module and a communication device equipped with the same and more particularly to a technique for improving characteristics of an array antenna.

BACKGROUND ART

Japanese Unexamined Patent Application Publication No. 2016-213927 discloses an array antenna in which a large number of antenna elements are arranged on one substrate.

CITATION LIST

Patent Document

Patent Document 1: Japanese Unexamined Patent

SUMMARY

Technical Problems

In the array antenna disclosed in Japanese Unexamined Patent Application Publication No. 2016-213927, since the large number of antenna elements are directly arranged on the one substrate, the substrate on which each antenna element is mounted tends to be increased in size. For this reason, as recognized by the present inventor, there is a concern that the substrate on which each antenna element is mounted is easily warped, or a facility for mounting each antenna element on the substrate is increased in size.

As a countermeasure against this, it is assumed that a large number of antenna elements are divided and arranged on a plurality of sub-substrates (sub-array antennas), and the plurality of sub-array antennas are arranged on a main substrate. However, in such an array antenna, depending on a distance relationship between the antenna element and an end surface of the sub-substrate, there is a concern that characteristics of a single antenna element are deteriorated or that a side lobe level of an entire array antenna is raised.

Additionally, as another countermeasure, it is also assumed to provide a groove portion (slit) for absorbing warpage in one substrate on which a large number of antenna elements are arranged. However, also in such an array antenna, depending on a distance relationship between the antenna element and the groove portion, there is a concern that characteristics of a single antenna element are deteriorated or that a side lobe level of an entire array antenna is raised.

The present disclosure has been made to solve such a problem, as well as other problems, and an aspect thereof is, in a case where a plurality of sub-array antennas are arranged to form an array antenna, to suppress a side lobe level in an entire array antenna without deteriorating characteristics of a single antenna element.

Additionally, another aspect of the present disclosure is, in an array antenna formed by arranging a plurality of antenna elements on a substrate including a groove portion, to suppress a side lobe level in the entire array antenna without deteriorating characteristics of a single antenna element.

Solutions

A sub-array antenna according to the present disclosure includes a substrate, and a plurality of antenna elements having a flat plate shape. The substrate has a first surface, a second surface facing the first surface, and an end surface connecting the first surface and the second surface. The plurality of antenna elements are aligned and arranged along the first surface at equal intervals on the first surface or in a layer between the first surface and the second surface. Under a condition λ is a wavelength of a radio wave in free space, a distance between centers of two of the plurality of antenna elements adjacent to each other is equal to or greater than λ/2. A distance between a center of an outer antenna element, which is one of the plurality of antenna elements that is arranged at a position adjacent to the end surface, and the end surface is equal to or greater than λ/9, and equal to or less than half a distance between respective centers of two of the plurality of antenna elements adjacent to each other.

In the above-described sub-array antenna, a distance between a center of an outer antenna element and an end surface of a sub-substrate is equal to or greater than λ/9, and equal to or less than half a distance between centers of two respective antenna elements adjacent to each other. Accordingly, in a case where a plurality of sub-array antennas are arranged to form an array antenna, it is possible to suppress a side lobe level in the array antenna as a whole, without deteriorating characteristics of a single antenna element.

An array antenna according to the present disclosure includes a substrate, and a plurality of antenna elements having a flat plate shape. The substrate has a first surface, a second surface facing the first surface, and a groove portion recessed to a side of the second surface from the first surface. The plurality of antenna elements are aligned and arranged along the first surface at equal intervals on the first surface or in a layer between the first surface and the second surface. Under a condition λ is a wavelength of a radio wave in free space, a distance between respective centers of two of the plurality of antenna elements adjacent to each other is equal to or greater than λ/2. A distance between a center of an antenna element, which is one of the plurality of antenna elements and is arranged at a position adjacent to the groove portion, and the groove portion is equal to or greater than λ/9 and equal to or less than half a distance between respective centers of two of the plurality of antenna elements adjacent to each other.

In the array antenna described above, a distance between a center of an antenna element, which is arranged at a position adjacent to the groove portion, and the groove portion is equal to or greater than λ/9, and equal to or less than half a distance between centers of two respective antenna elements adjacent to each other. This makes it possible to suppress a side lobe level in the array antenna as a whole, without deteriorating characteristics of a single antenna element.

Another sub-array antenna according to the present disclosure includes a substrate, and a plurality of antenna elements having a flat plate shape. The substrate has a first surface, a second surface facing the first surface, and an end surface connecting the first surface and the second surface. The plurality of antenna elements are aligned and arranged along the first surface at equal intervals on the first surface or in a layer between the first surface and the second surface. Under a condition a distance between respective centers of two of the antenna elements adjacent to each other is P, a distance between a center of an outer antenna element, which is one of the plurality of antenna elements and is arranged at a position adjacent to the end surface, and the end surface is equal to or greater than 2/9 of P and equal to or less than half of P.

In the above-described sub-array antenna, a distance between the center of an outer antenna element and an end surface of a sub-substrate is equal to or greater than λ/9 of P (distance between centers of two respective antenna elements adjacent to each other), and equal to or less than half of P. Accordingly, in a case where a plurality of sub-array antennas are arranged to form an array antenna, it is possible to suppress a side lobe level in the array antenna as a whole, without deteriorating characteristics of a single antenna element.

Advantageous Effects

According to the present disclosure, it is possible to suppress a side lobe level in an entire array antenna, without deteriorating characteristics of a single antenna element.

DESCRIPTION OF EMBODIMENTS

Figure 1:
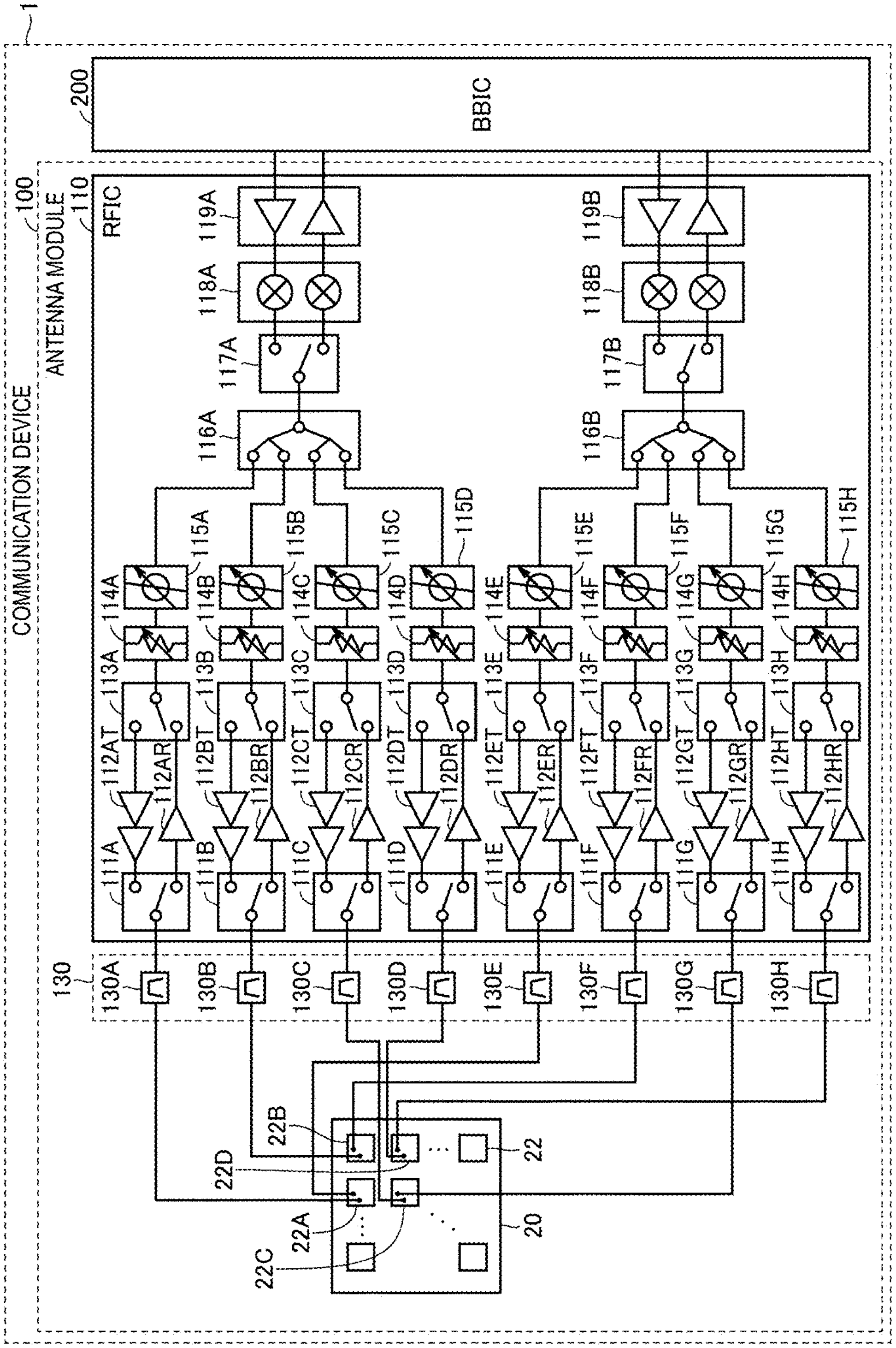
FIG. 1 is an example of a block diagram of a communication device.

Hereinafter, an embodiment of the present disclosure will be described in detail with reference to the drawings. Note that, in the drawings, the same or equivalent portions are denoted by the same reference numerals, and description thereof will not be repeated.

(Basic Configuration of Communication Device)

FIG. 1 is an example of a block diagram of a communication device 1 to which an antenna module 100 according to the present embodiment is applied. The communication device 1 is, for example, a mobile terminal such as a mobile phone, a smart phone, or a tablet, or a personal computer having a communication function. An example of a frequency band of a radio wave used in the antenna module 100 according to the present embodiment includes a radio wave in a millimeter wave band having center frequencies of 28 GHz, 39 GHz, 60 GHz, and the like, but the present embodiment is applicable to a radio wave in a frequency band other than the above, such as a band up to 300 GHz.

Referring to FIG. 1, the communication device 1 includes the antenna module 100, and a BBIC 200 constituting a baseband signal processing circuit. The antenna module 100 includes an RFIC 110 that is an example of a feed circuit, a plurality of sub-array antennas 20, and a filter device 130. The sub-array antenna 20 includes a plurality of antenna elements (radiation electrodes) 22 having a flat plate shape. The communication device 1 up-converts a signal transmitted from the BBIC 200 to the antenna module 100 into a radio frequency signal and radiates the radio frequency signal from the antenna element 22 and down-converts a radio frequency signal received by the antenna element 22 and processes the radio frequency signal in the BBIC 200.

Note that, in FIG. 1, for ease of explanation, only one sub-array antenna 20 is illustrated, and the other sub-array antennas 20 having a similar configuration are omitted. In addition, in FIG. 1, for ease of description, only a configuration corresponding to four antenna elements 22 (22A to 22D) among the antenna elements 22 included in the sub-array antenna 20 is illustrated, and a configuration corresponding to other antenna elements 22 having a similar configuration is omitted. Additionally, although FIG. 1 illustrates an example in which the sub-array antenna 20 has a two-dimensional array in which the antenna elements 22 are arranged in a two-dimensional array, the sub-array antenna 20 may be a one-dimensional array in which the antenna elements 22 are arranged in a line.

Further, the sub-array antenna 20 according to the present embodiment is a so-called dual-polarization type antenna device capable of radiating two radio waves having polarization directions different from each other from each of the antenna elements 22. Thus, a radio frequency signal for first polarization and a radio frequency signal for second polarization are supplied from the RFIC 110 to each antenna element 22. Note that, the sub-array antenna 20 is not limited to the dual-polarization type antenna device and may be a single-polarization type antenna device.

The RFIC 110 includes switches 111A to 111H, 113A to 113H, 117A, and 117B, power amplifiers 112AT to 112HT, low-noise amplifiers 112AR to 112HR, attenuators 114A to 114H, phase-shifters 115A to 115H, signal multiplexers/demultiplexers 116A and 116B, mixers 118A and 118B, and amplifier circuits 119A and 119B. Among these, a configuration of the switches 111A to 111D, 113A to 113D, and 117A, the power amplifiers 112AT to 112DT, the low-noise amplifiers 112AR to 112DR, the attenuators 114A to 114D, the phase-shifters 115A to 115D, the signal multiplexer/demultiplexer 116A, the mixer 118A, and the amplifier circuit 119A is a circuit for a radio frequency signal for the first polarization. Additionally, a configuration of the switches 111E to 111H, 113E to 113H, and 117B, the power amplifiers 112ET to 112HT, the low-noise amplifiers 112ER to 112HR, the attenuators 114E to 114H, the phase-shifters 115E to 115H, the signal multiplexer/demultiplexer device 116B, the mixer 118B, and the amplifier circuit 119B is a circuit for a radio frequency signal for the second polarization.

When a radio frequency signal is transmitted, the switches 111A to 111H and 113A to 113H are switched to sides of the power amplifiers 112AT to 112HT, respectively, and the switches 117A and 117B are connected to transmission side amplifiers of the amplifier circuits 119A and 119B, respectively. When a radio frequency signal is received, the switches 111A to 111H and 113A to 113H are switched to sides of the low-noise amplifiers 112AR to 112HR, respectively, and the switches 117A and 117B are connected to reception side amplifiers of the amplifier circuits 119A and 119B, respectively.

The filter device 130 includes filter devices 130A to 130H. Note that, in the following description, the filter devices 130A to 130H may be collectively referred to as the "filter device 130". The filter devices 130A to 130H are connected to the switches 111A to 111H in the RFIC 110, respectively. As will be described later, each of the filter devices 130A to 130H has a function of attenuating a radio frequency signal in a specific frequency band.

A signal transmitted from the BBIC 200 is amplified by the amplifier circuit 119A and up-converted by the mixer 118A or amplified by the amplifier 119B and up-converted by the mixer 118B. Transmission signals, which are the up-converted radio frequency signals, are demultiplexed into four by the signal multiplexer/demultiplexer 116A or 116B, passed through corresponding signal paths, and are each fed to a different feeding element (signal path).

A radio frequency signal from the switch 111A is supplied to a first part of a feeding element (an electrical connection from the respective filter to the feed point on the corresponding antenna element) via the filter device 130A, and a radio frequency signal from the switch 111E is supplied to a second part of the feeding element via the filter device 130E for the antenna element 22A. In this context, two signal paths are provided as constituent parts of feeding element for each antenna element. However, each signal path may be construed as a feeding element as well. Similarly, a radio frequency signal from the switch 111B is supplied to a first part of a feeding element via the filter device 130B, and a radio frequency signal from the switch 111F is supplied to a second part of the feeding element via the filter device 130F for the antenna element 22B. A radio frequency signal from the switch 111C is supplied to a first-part of the feeding element via the filter device 130C, and a radio frequency signal from the switch 111G is supplied to the second part of the feeding element via the filter device 130G for the antenna element 22C. A radio frequency signal from the switch 111D is supplied to a first part of a feeding element via the filter device 130D, and a radio frequency signal from the switch 111H is supplied to a second part of the feeding element via the filter device 130H for the antenna element 22D.

Directivity of the antenna device 120 can be adjusted by a phase shift degree of each of the phase-shifters 115A to 115H arranged in respective signal paths being individually adjusted.

Reception signals, which are radio frequency signals input to the feeding elements via the respective the antenna elements, are transmitted to the RFIC 110 via the filter device 130, correspondingly passed through four different signal paths, and are multiplexed in the signal multiplexer/demultiplexer 116A or 116B. The multiplexed reception signal is down-converted by the mixer 118A and amplified by the amplifier circuit 119A or down-converted by the mixer 118B and amplified by the amplifier circuit 119B and is transmitted to the BBIC 200.

The RFIC 110 is formed as, for example, a one-chip integrated-circuit component including the above-described circuit configuration. Alternatively, the device (switch, power amplifier, low-noise amplifier, attenuator, or phase-shifter) in the RFIC 110 corresponding to each feeding element 121 may be formed as a one-chip integrated-circuit component per corresponding feeding element 121.

(Configuration of Antenna Module)

Figure 2:
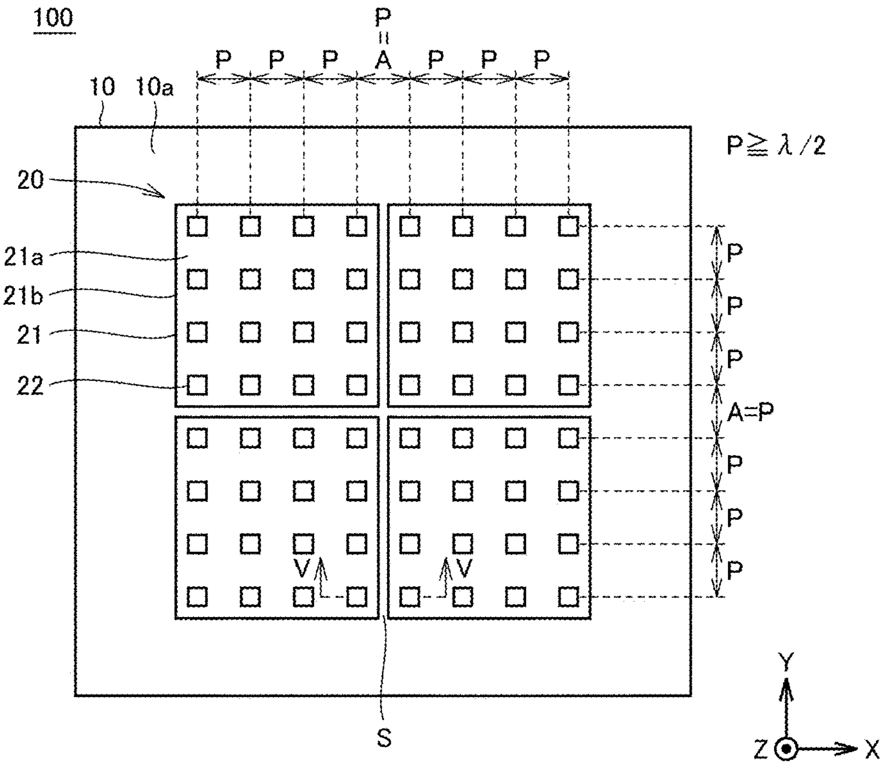
FIG. 2 is a plan view of an antenna module.

FIG. 2 is a plan view of the antenna module 100 according to the present embodiment. Note that, hereinafter, a direction normal to a plane illustrated in FIG. 2 is also referred to as a "Z-axis direction", and respective directions perpendicular to the Z-axis direction and perpendicular to each other are also referred to as an "X-axis direction" and a "Y-axis direction". In addition, hereinafter, descriptions will be given with a positive direction in the Z-axis direction as an upper surface side (radiating side) and a negative direction in the Z-axis as a lower surface side in each drawing.

The antenna module 100 includes a main substrate 10 in addition to the RFIC 110 and the plurality of sub-array antennas 20. In the example illustrated in FIG. 2, four sub-array antennas 20 are arranged in a 2×2 two-dimensional array on an upper surface 10*a* of the main substrate 10.

Each sub-array antenna 20 includes a sub-substrate 21 and a plurality of antenna elements 22. In the example illustrated in FIG. 2, 16 antenna elements 22 are arranged in a 4×4 two-dimensional array on an upper surface 21*a* of the sub-substrate 21.

As described above, by arranging, on the main substrate 10, the four sub-array antennas 20 each having the 16 antenna elements 22 arranged on the sub-substrate 21, the antenna module 100 is formed in which 64 antenna elements in total are arranged in a 8×8 two-dimensional array. In other words, the antenna module 100 is an array antenna in which the 64 antenna elements are divided and mounted on the four sub-substrates 21.

In each sub-array antenna 20, the antenna elements 22 are aligned and arranged at equal intervals in the X-axis direction and the Y-axis direction on the upper surface 21*a* of the sub-substrate 21. In each sub-array antenna 20, a distance between respective plane centers (each being an intersection point of diagonal lines) of two antenna elements 22 adjacent to each other in each of the X-axis direction and the Y-axis direction (hereinafter, also referred to as a "distance P between antenna elements") is set to a value equal to or greater than λ/2. "λ" is a wavelength of a radio wave in free space.

The main substrate 10, the sub-substrate 21, and the antenna element 22 are all formed in a substantially rectangular shape in plan view from the Z-axis direction. A space S is formed between the sub-substrates 21 of the sub-array antennas 20 adjacent to each other.

When an antenna element 22 arranged at a position adjacent to an end surface 21*b* of the sub-substrate 21 is defined as an "outer antenna element", a distance between surface centers of outer antenna elements of the sub-array antennas 20 adjacent to each other (hereinafter, also simply referred to as a "distance A between outer antenna elements") is set to the same value as the "distance P between antenna elements", which is a distance between plane centers of two antenna elements 22 adjacent to each other in each sub-array antenna 20. That is, in the antenna module 100, all the antenna elements 22 are arranged at equal pitches at intervals equal to or greater than λ/2 in the X-axis direction and the Y-axis direction.

Figure 3:
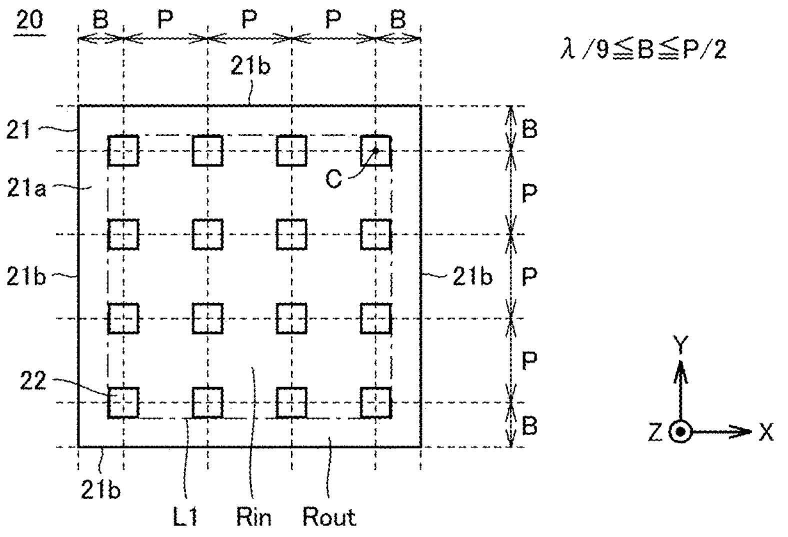
FIG. 3 is a plan view (part 1) of a sub-array antenna.

FIG. 3 is a plan view of the sub-array antenna 20. As described above, the 16 antenna elements 22 are arranged in a 4×4 two-dimensional array on the upper surface 21*a* of the sub-substrate 21. Further, the distance P between antenna elements is set to a value equal to or greater than λ/2.

Among the antenna elements 22, an antenna element 22 arranged at a position adjacent to the end surface 21*b* of the sub-substrate 21 is the above-described "outer antenna element". In the present embodiment, a distance between a plane center C of the outer antenna element and the end surface 21*b* (hereinafter also referred to as a "substrate end distance B") is set to a value equal to or greater than λ/9 and equal to or less than P/2.

Here, since the distance P between antenna elements is a value equal to or greater than λ/2, and a relationship "λ≤2P" holds, the substrate end distance B can be rephrased as a value equal to or greater than 2P/9 and equal to or less than P/2. That is, the substrate end distance B is equal to or greater than 2/9 of the distance P between antenna elements and equal to or less than half the distance P between antenna elements.

Note that, hereinafter, when the sub-array antenna 20 is viewed in plan view from the Z-axis direction, a region between an outer antenna element and the end surface 21*b* (a region outside a frame line L1 indicated by a one-dot chain line in FIG. 3) is also referred to as an "outer region Rout", and a region inside the outer region Rout (a region inside the frame line L1) is also referred to as an "inner region Rin".

Figure 4:
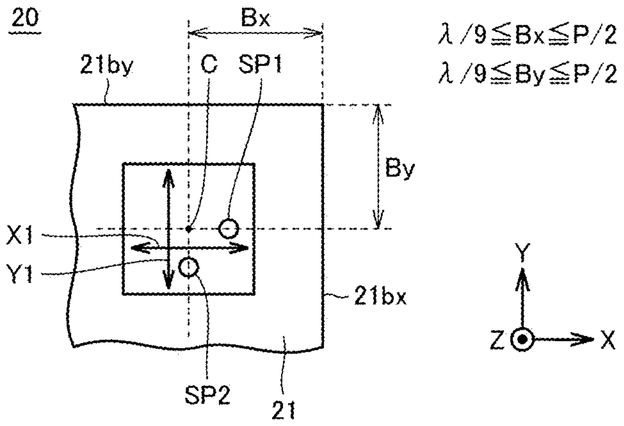
FIG. 4 is a partially enlarged view of a sub-substrate in the sub-array antenna.

FIG. 4 is a partially enlarged view of the sub-substrate 21 in the sub-array antenna 20. As described above, the sub-array antenna 20 is a so-called dual-polarization type antenna device. Thus, each antenna element 22 includes two feeding points SP1 and SP2, each fed with a part (first part or second part) of a feeding element, previously discussed.

The feeding point SP1 is arranged at a position offset from the plane center C of the antenna element 22 in a positive direction of the X-axis in FIG. 4. A radio frequency signal for the first polarization is supplied to the feeding point SP1 from the RFIC 110. Accordingly, a radio wave with the X-axis direction as a polarization direction is radiated from the antenna element 22.

The feeding point SP2 is arranged at a position offset from the plane center C of the antenna element 22 in a negative direction of the Y-axis in FIG. 4. A radio frequency signal for the second polarization is supplied to the feeding point SP2 from the RFIC 110. Accordingly, a radio wave with the Y-axis direction as a polarization direction is radiated from the antenna element 22.

The sub-substrate 21 is formed in a substantially rectangular shape as described above and includes an end surface 21*b* perpendicular to the X-axis direction (hereinafter also referred to as an "X end surface 21*bx*") and an end surface 21*b* perpendicular to the Y-axis direction (hereinafter also referred to as a "Y end surface 21*by*").

Both a distance Bx between a plane center C of an outer antenna element and the X end surface 21*bx*, and a distance By between a plane center C of an outer antenna element and the Y end surface 21*by* are set to a value equal to or greater than λ/9 and equal to or less than P/2.

Note that, when the sub-array antenna 20 is a single polarization type antenna device, for example, the feeding point SP2 may be omitted to provide only the feeding point SP1. Note that, for example, when only the feeding point SP1 is provided, the distance Bx between the plane center C of the outer antenna element and the X end surface 21*bx* is set to a value equal to or greater than λ/9, but the distance By between the plane center C of the outer antenna element and the Y end surface 21*by* need not necessarily be set to a value equal to or greater than λ/9.

Figure 5:
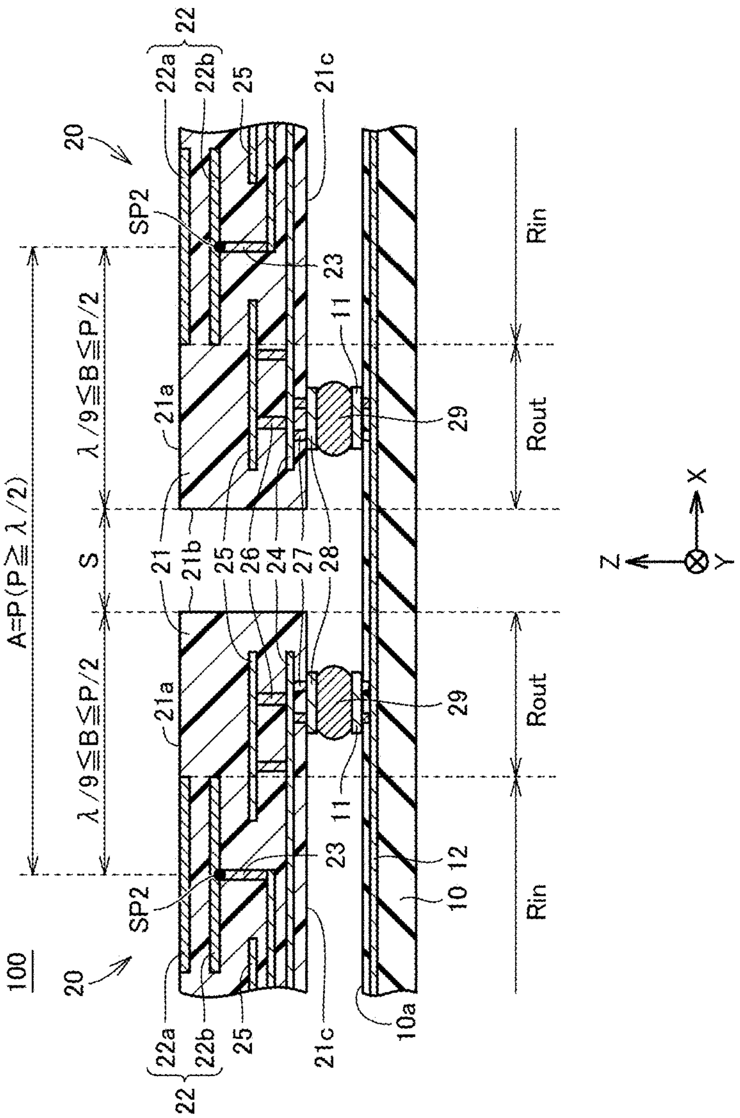
FIG. 5 is a sectional view (part 1) of the antenna module.

FIG. 5 is a sectional view of the antenna module 100 taken along a line V-V in FIG. 2. As described above, the antenna module 100 includes the main substrate 10 and the plurality of sub-array antennas 20 arranged on the upper surface 10*a* of the main substrate 10. The main substrate 10 includes a ground terminal 11 and a ground electrode 12. The ground terminal 11 is arranged on the upper surface 10*a* of the main substrate 10 and is connected to the ground electrode 12 through a via.

Each sub-array antenna 20 includes the sub-substrate 21 and the antenna element 22. Note that, the antenna element 22 illustrated in FIG. 5 is an "outer antenna element" arranged at a position adjacent to the end surface 21*b* of the sub-substrate 21 in each sub-array antenna 20.

The sub-substrate 21 is, for example, a low temperature co-fired ceramics (LTCC) multilayer substrate, a multilayer resin substrate formed by laminating a plurality of resin layers formed of resin such as epoxy or polyimide, a multilayer resin substrate formed by laminating a plurality of resin layers formed of liquid crystal polymer (LCP) having a lower dielectric constant, a multilayer resin substrate formed by laminating a plurality of resin layers formed of a fluorine-based resin, or a ceramic multilayer substrate other than LTCC. Note that, the sub-substrate 21 is not limited to a multilayer substrate and may be a substrate having single-layer structure. The main substrate 10 may also have composition and layer structure similar to those of the sub-substrate 21.

Additionally, the sub-substrate 21 may be a multilayer resin substrate, and the main substrate 10 may be a low-temperature co-fired ceramics (LTCC) substrate. In general, an insertion loss of a filter directly below an antenna is correlated with transmission power (EIRP: Equivalent Isotropically Radiated Power) and reception sensitivity and is required to be as low as possible in order to improve performance of a radio device. At the same time, the filter also needs attenuation performance in a vicinity of a passband. Thus, it is necessary to increase a Q value of the filter. In order to increase the Q value of the filter, increasing a substrate thickness is a significant method. A millimeter wave filter has an advantage of reduction in size when a base material having a high dielectric constant is used. From this point of view, it is advantageous to use an LTCC substrate as the main substrate 10. On the other hand, in a patch antenna as well, a substrate thickness is necessary for ensuring a band, but a lower dielectric constant is advantageous for ensuring a band and improving gain. That is, a filter and an antenna are different in characteristics required for a base material, and when a filter and an antenna are formed in the same base material, performance of either of them is restricted. In addition, in a case of an LTCC substrate, since there is a limit to a possible substrate thickness in manufacturing, thickness limits arise for both a filter and an antenna, and design restrictions arise for both the filter and the antenna when formed of the same base material. In view of the above, the sub-substrate 21 on which the antenna element 22 is arranged and the main substrate 10 on which the filter device 130 is arranged may be formed of different base materials, and specifically, as described above, the sub-substrate 21 may be a multilayer resin substrate and the main substrate 10 may be a low temperature co-fired ceramics (LTCC) substrate.

The sub-substrate 21 has the upper surface 21*a*, a lower surface 21*c* facing the upper surface 21*a*, and the end surface 21*b* connecting the upper surface 21*a* and the lower surface 21*c*. Further, the sub-substrate 21 includes a feed line 23, ground electrodes 24 and 25, vias 26 and 27, and a ground terminal 28.

The feed line 23 is connected to the feeding point SP2 of the antenna element 22. The feed line 23 is formed of a wiring pattern arranged in a layer extending in the X-axis direction and the Y-axis direction, and a via extending in the Z-axis direction. A radio frequency signal from the RFIC 110 is transmitted to the feeding point SP2 via the feed line 23. Note that, although not illustrated in FIG. 5, a feed line for transmitting a radio frequency signal to the feeding point SP1 (see FIG. 4) of the antenna element 22 is also provided on the sub-substrate 21.

The ground terminal 28 is arranged on the lower surface 21*c* of the sub-substrate 21. In a state where the sub-array antenna 20 is mounted on the main substrate 10, the ground terminal 28 is connected to the ground terminal 11 of the main substrate 10 via a solder bump 29. The ground terminal 28 and the solder bump 29 are arranged in the outer region Rout.

The ground electrode 24 is connected to the ground terminal 28 through the via 27. The ground electrode 25 is arranged in a layer closer to a side of the upper surface 21*a* than the ground electrode 24, and is connected to the ground electrode 24 through the via 26. The ground electrodes 24, 25, and the vias 26 and 27 are formed in a layer between the layer in which the antenna element 22 is arranged and the lower surface 21*c*. Note that, when the sub-substrate 21 is a multilayer substrate in which an upper substrate and a lower substrate are laminated, the antenna element 22 may be arranged on the upper substrate, and the ground electrodes 24, 25, and the vias 26, 27 may be arranged on the lower substrate.

The ground electrodes 24 and 25 extend from the inner region Rin to the outer region Rout. That is, a part of the ground electrodes 24 and 25 is arranged in the outer region Rout. However, an outer end portion of each of the ground electrodes 24 and 25 does not reach the end surface 21*b*. That is, the ground electrodes 24 and 25 are not exposed to the end surface 21*b*.

The via 26 connecting the ground electrode 24 and the ground electrode 25, and the via 27 connecting the ground electrode 24 and the ground terminal 28 are both arranged in the outer region Rout. Note that, a part of the vias 26 and 27 may be arranged in the inner region Rin.

The antenna element 22 includes a parasitic element 22*a* and a feeding element 22*b*. The parasitic element 22*a* is arranged on the upper surface 21*a* of the sub-substrate 21, and the feeding element 22*b* is arranged in a layer between the upper surface 21*a* and the lower surface 21*c*. In the example illustrated in FIG. 2, electrodes having substantially the same size are used as the feeding element 22*b* and the parasitic element 22*a*, respectively. In such a configuration, the number of frequency bands that can be radiated is one, but a frequency band width can be expanded by the parasitic element 22*a*, and it is possible to support a plurality of frequency bands.

Further, the antenna element 22 may include only the feeding element 22*b*. In this case, the feeding element 22*b* may be arranged in a layer between the upper surface 21*a* and the lower surface 21*c* as illustrated in FIG. 5, or may be arranged on the upper surface 21*a*.

Note that in FIG. 5, conductors constituting the antenna element, the electrode, the wiring pattern, the via, and the like are formed of aluminum (Al), copper (Cu), gold (Au), silver (Ag), or metal containing an alloy thereof as a main component.

In the antenna module 100 according to the present embodiment, a part of the ground electrodes 24 and 25, and the vias 26 and 27 are arranged in the outer region Rout in the sub-array antenna 20. This strengthens grounding in the sub-array antenna 20, and makes it unlikely for characteristics of the outer antenna elements to deteriorate.

Further, in the antenna module 100 according to the present embodiment, as illustrated in FIG. 2 and FIG. 5, the substrate end distance B is set to a value equal to or greater than λ/9 in each sub-array antenna 20. This makes it possible to ensure an area of each of the ground electrodes 24 and 25 in the outer region Rout with respect to an outer antenna element, and to prevent characteristics of the outer antenna element from being deteriorated.

Figure 6:
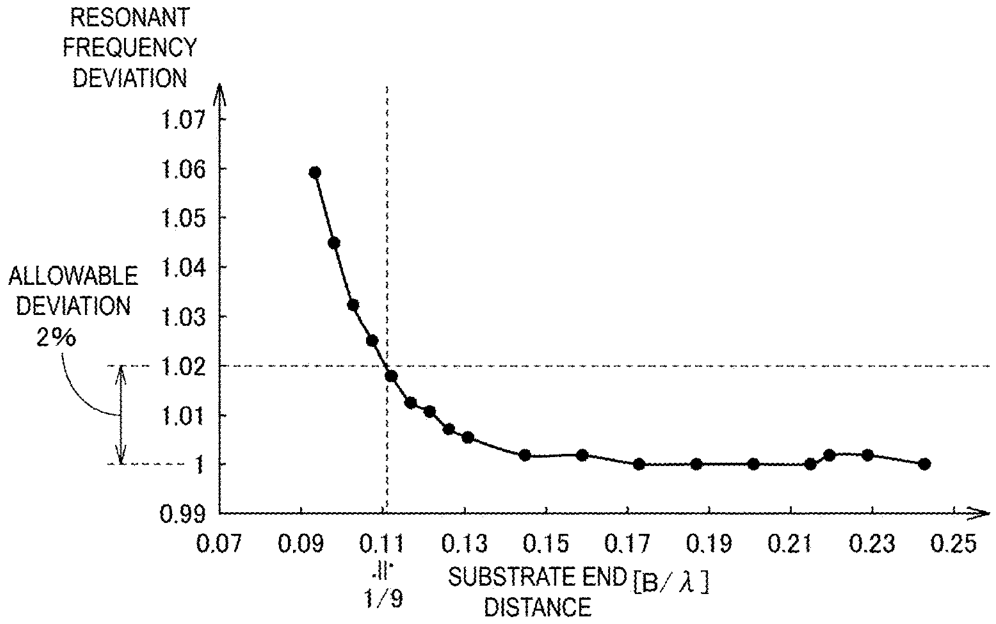
FIG. 6 is a diagram illustrating an example of simulation results of resonant frequency characteristics.

FIG. 6 is a diagram illustrating an example of a simulation result of resonant frequency characteristics of an outer antenna element. In FIG. 6, a horizontal axis indicates value obtained by dividing the substrate end distance B by the wavelength λ (=B/λ), and a vertical axis indicates resonant frequency deviation ratio with respect to a design value (target value). Note that, in general, an allowable value for the resonant frequency deviation ratio with respect to the design value is about 2%. Note that, in FIG. 6, the substrate end distance B is a distance between the plane center C of an outer antenna element and the end surface 21*b* perpendicular to a polarization direction (the X end surface 21*bx* when the polarization direction is the X-axis direction, or the Y end surface 21*by* when the polarization direction is the Y-axis direction).

As shown in FIG. 6, when B/λ is less than 0.13, the resonant frequency deviation ratio gradually increases from 1, and when B/λ is 0.11 (approximately 1/9), the resonant frequency deviation ratio reaches the allowable value, which is 2%. Based on such an experimental result, in the present embodiment, the substrate end distance B is set to a value equal to or greater than λ/9. This makes it possible to suppress the resonant frequency deviation ratio of the outer antenna element to be less than the allowable value, which is 2%.

Note that, in the present embodiment, both the distance Bx between the plane center C of an outer antenna element and the X end surface 21*bx*, and the distance By between the plane center C of an outer antenna element and the Y end surface 21*by*, are set to a value equal to or greater than λ/9 (see FIG. 4 above). This makes it possible to suppress a resonant frequency deviation to be less than an allowable value, with respect to both a radio wave with the X-axis direction as a polarization direction, and a radio wave with the Y-axis direction as a polarization direction.

Furthermore, in the antenna module 100 according to the present embodiment, as illustrated in FIG. 2, a large number of antenna elements 22 are divided, mounted, and formed on the sub-array antennas 20. Additionally, in each sub-array antenna 20, the substrate end distance B is set to a value equal to or less than P/2. Thus, when the plurality of sub-array antennas 20 are arranged to form the antenna module 100, the distance A between outer antenna elements can be set to the same value as the distance P between antenna elements, without interference between the sub-substrates 21 of the respective sub-array antennas 20 adjacent to each other. This makes it possible to, in the antenna module 100, arrange all the antenna elements 22 at equal pitches at intervals equal to or greater than λ/2 (distance P between antenna elements).

Figure 7:
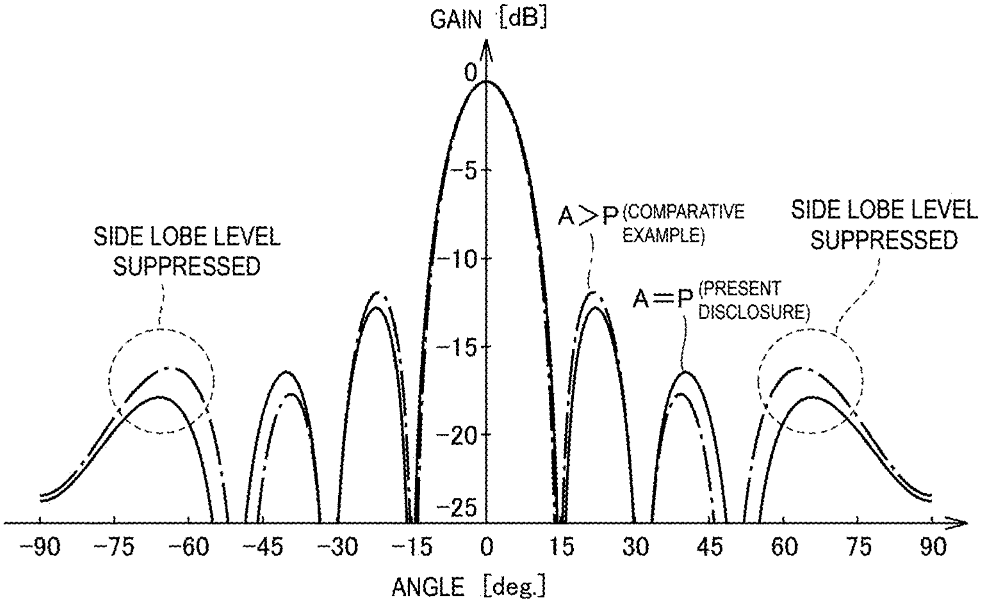
FIG. 7 is a diagram illustrating an example of simulation results of radiation characteristics.

FIG. 7 is a diagram illustrating an example of simulation results of radiation characteristics in a case where the distance A between outer antenna elements is set to the same value as the distance P between antenna elements (the present disclosure), and in a case where the distance A between outer antenna elements is set to a value greater than the distance P between antenna elements (a comparative example). In FIG. 7, a horizontal axis indicates angle with respect to the Z-axis direction, and a vertical axis indicates gain. Note that, in FIG. 7, the simulation result in the case of A=P (the present disclosure) is indicated by a solid line, and the simulation result in the case of A>P (the comparative example) is indicated by a one-dot chain line.

As can be understood from FIG. 7, when the gain (solid line) in the case of A=P is smaller than the gain (one-dot chain line) in the case of A>P, particularly in a range where magnitude of the angle with respect to the Z-axis direction exceeds 60°. Thus, a side lobe can be suppressed by setting A=P. That is, if the substrate end distance B is a value greater than P/2, the sub-substrates 21 adjacent interfere with each other, and the distance A between outer antenna elements becomes greater than the distance P between antenna elements, and thus there is a concern that a side lobe level of the antenna module 100 as a whole is deteriorated, but in the present embodiment, such deterioration can be suppressed.

Further, in the antenna module 100 according to the present embodiment, the adjacent sub-substrates 21 are not in contact with each other, and the space S having a lower effective dielectric constant compared to the sub-substrate 21 is formed. This makes it easy to ensure isolation between the sub-array antennas 20 adjacent to each other. In addition, since the space S is formed between the sub-substrates 21 adjacent to each other, and the sub-substrates 21 are not in contact with each other, it is possible to suppress variations in beams for both a radio wave with the X-axis direction as a polarization direction, and a radio wave with the Y-axis direction as a polarization direction.

Furthermore, in the antenna module 100 according to the present embodiment, the outer end portion of each of the ground electrodes 24 and 25 is not exposed to the end surface 21*b* in the sub-array antenna 20. Accordingly, isolation between the sub-array antennas 20 adjacent to each other can be more appropriately ensured.

Figure 8:
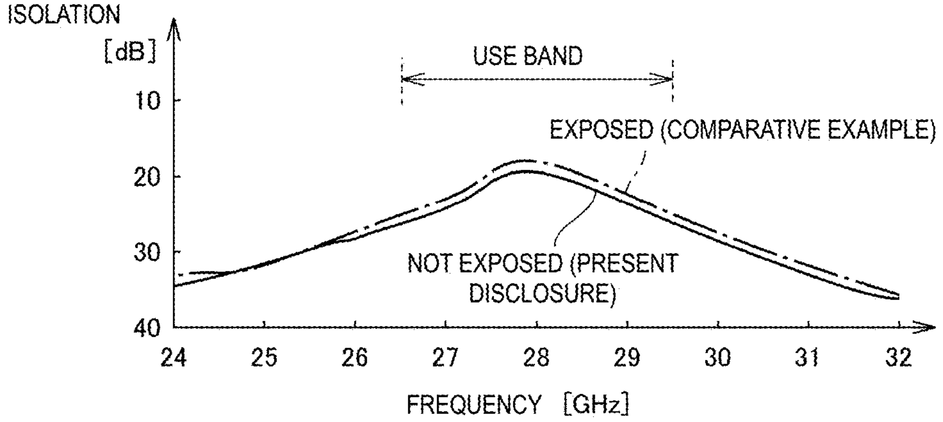
FIG. 8 is a diagram (part 1) illustrating an example of simulation results of isolation characteristics.

FIG. 8 is a diagram illustrating an example of simulation results of isolation characteristics between the sub-array antennas 20 adjacent to each other. FIG. 8 is a graph illustrating a change in isolation with respect to frequency, where a horizontal axis indicates frequency, and a vertical axis indicates isolation. Note that, a lower side in the vertical axis indicates higher isolation.

In FIG. 8, a solid line indicates the simulation result in a case where the ground electrodes 24 and 25 are not exposed to the end surface 21*b* (the present disclosure), and a one-dot chain line indicates the simulation result in a case where the ground electrodes 24 and 25 are exposed to the end surface 21*b* (a comparative example). In FIG. 8, it is assumed that a frequency band with 28 GHz as a center frequency is used in the antenna module 100.

From the simulation results illustrated in FIG. 8, it can be understood that, in a frequency use band of the antenna module 100, the isolation is larger in the case where the ground electrodes 24 and 25 are not exposed to the end surface 21*b* (solid line) than in the case where the ground electrodes 24 and 25 are exposed to the end surface 21*b* (one-dot chain line). That is, by using the configuration as in the embodiment, the isolation can be more appropriately ensured.

As described above, in the sub-array antenna 20 according to the present embodiment, the "substrate end distance B", which is a distance between a plane center of an outer antenna element and the end surface 21*b*, is set to a value equal to or greater than λ/9 and equal to or less than P/2. Accordingly, all the antenna elements 22 can be arranged at equal pitches by setting the distance A between outer antenna elements to the same value as the distance P between antenna elements, while ensuring the area of each of the ground electrodes 24 and 25 in the outer region Rout with respect to the outer antenna elements. As a result, when a plurality of sub-array antennas 20 are arranged to form an array antenna, a side lobe level of the array antenna as a whole can be suppressed without characteristics of a single antenna element 22 deteriorating.

MODIFIED EXAMPLE 1

In the above-described embodiment, the example in which the ground terminal 28 and the solder bump 29 are arranged in the outer region Rout has been described. However, a modification may be adopted in which the ground terminal 28 and the solder bump 29 are arranged in the inner region Rin.

Figure 9:
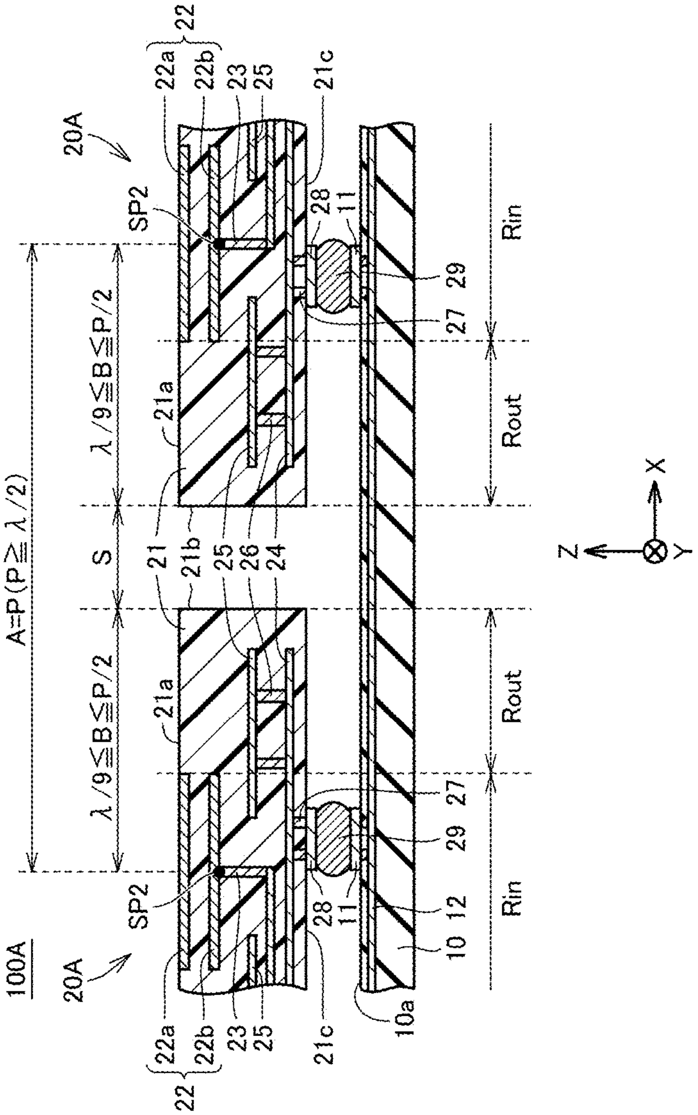
FIG. 9 is a sectional view (part 2) of an antenna module.

FIG. 9 is a sectional view of an antenna module 100A according to Modified Example 1. The sectional view of the antenna module 100A illustrated in FIG. 9 is obtained by changing the sub-array antenna 20 to a sub-array antenna 20A with respect to the sectional view of the antenna module 100 illustrated in FIG. 5 described above. The sub-array antenna 20A is obtained by changing respective positions of the ground terminal 28 and the solder bump 29 with respect to the sub-array antenna 20 described above. Since structure other than that is the same as that of antenna module 100 described above, a detailed description thereof will not be repeated here.

In the sub-array antenna 20A, the ground terminal 28 is arranged in the inner region Rin. Accordingly, the solder bump 29 is also arranged in the inner region Rin. In this manner, by arranging the ground terminal 28 and the solder bump 29 in the inner region Rin, a path from the ground terminal 28 of one sub-array antenna 20A of the sub-array antennas 20A adjacent to each other to the ground terminal 28 of another sub-array antenna 20A can be made longer. Accordingly, a path from the ground electrode 24 of one sub-array antenna 20A of the sub-array antennas 20A adjacent to each other to the ground electrode 24 of another sub-array antenna 20A via the respective ground terminals 28 can be made longer. This makes it possible to reduce a current flowing from the one sub-array antenna 20A to the other sub-array antenna 20A via the respective ground terminals 28. As a result, isolation between the sub-array antennas 20A adjacent to each other can be further improved.

Figure 10:
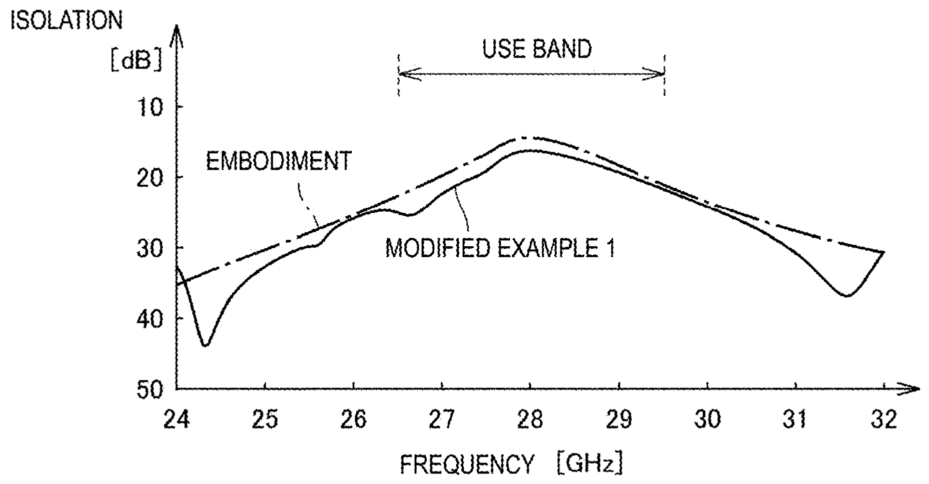
FIG. 10 is a diagram (part 2) illustrating an example of simulation results of isolation characteristics.

FIG. 10 is a diagram illustrating an example of simulation results of isolation characteristics between the sub-array antennas 20A adjacent to each other. FIG. 10 is a graph, similar to FIG. 8 described above, illustrating a change in isolation with respect to frequency, where a horizontal axis indicates frequency, and a vertical axis indicates isolation. A lower side in the vertical axis indicates higher isolation.

In FIG. 10, a solid line indicates the simulation result in a case where the ground terminal 28 and the solder bump 29 are arranged in the inner region Rin (Modified Example 1), and a one-dot chain line indicates the simulation result in a case where the ground terminal 28 and the solder bump 29 are arranged in the outer region Rout. Note that, in FIG. 10 as well, similar to FIG. 8, it is assumed that a frequency band with 28 GHz as a center frequency is used in the antenna module 100A.

From the simulation results illustrated in FIG. 10, it can be understood that the isolation is higher in the case where the ground terminal 28 and the solder bump 29 are arranged in the inner region Rin (solid line) than in the case where the ground terminal 28 and the solder bump 29 are arranged in the outer region Rout (one-dot chain line) in a frequency use band of the antenna module 100A. That is, the isolation can be further improved by using the configuration as in Modified Example 1.

MODIFIED EXAMPLE 2

In the above-described embodiment, the example in which the lower surface 21*c* of the sub-substrate 21 is exposed has been described. However, the lower surface 21*c* of the sub-substrate 21 may be molded with resin.

Figure 11:
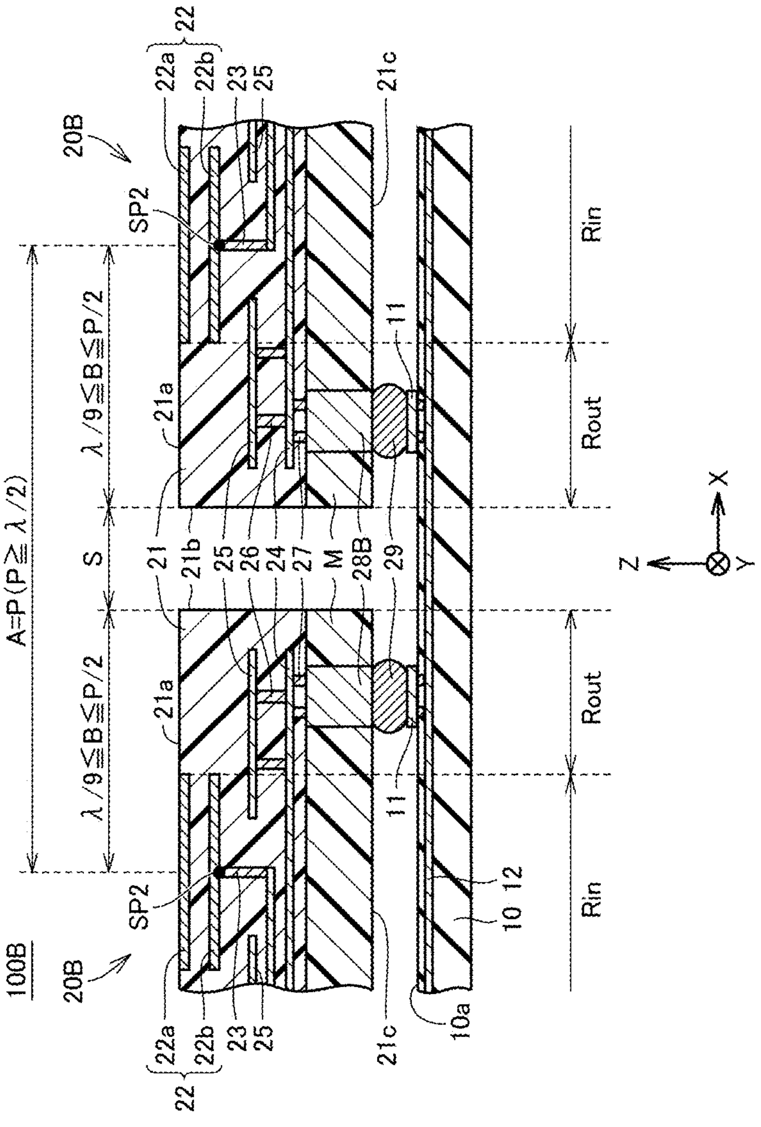
FIG. 11 is a sectional view (part 3) of an antenna module.

FIG. 11 is a sectional view of an antenna module 100B according to Modified Example 2. The sectional view of the antenna module 100B illustrated in FIG. 11 is obtained by changing the sub-array antenna 20 to a sub-array antenna 20B with respect to the sectional view of the antenna module 100 illustrated in FIG. 5 described above. The sub-array antenna 20B is obtained by changing the ground terminal 28 to a ground terminal 28B, and molding an entirety of the lower surface 21*c* of the sub-substrate 21 with a sealing resin M, with respect to the sub-array antennas 20 described above. Since structure other than that is the same as that of antenna module 100 described above, a detailed description thereof will not be repeated here.

The sealing resin M has a thickness in the Z-axis direction. The ground terminal 28B extends in the Z-axis direction in a state of penetrating the sealing resin M. One end portion of the ground terminal 28B is connected to the via 27 on an upper surface of the sealing resin M (the lower surface 21*c* of the sub-substrate 21), and another end portion of the ground terminal 28B is connected to the ground electrode 12 of the main substrate 10 via the solder bump 29. Note that, a space corresponding to a thickness of the solder bump 29 is formed between a lower surface of the sealing resin M and the upper surface 10*a* of the main substrate 10.

In this manner, by molding the lower surface 21*c* of the sub-substrate 21 with the sealing resin M that has the thickness in the Z-axis direction, a path from the ground electrode 24 of one sub-array antenna 20B of the sub-array antennas 20B adjacent to each other to the ground electrode 24 of another sub-array antenna 28B via the respective ground terminals 20B is made longer. Thus, it is possible to reduce a current flowing from the one sub-array antenna 20A of the sub-array antennas 20A adjacent to each other to the other sub-array antenna 20A via the respective ground terminals 28B. As a result, isolation between the sub-array antennas 20B adjacent to each other can be further improved.

MODIFIED EXAMPLE 3

In the above-described embodiment, an example in which a space is formed between the lower surface 21*c* of the sub-substrate 21 and the upper surface 10*a* of the main substrate 10 has been described. However, the space between the lower surface 21*c* of the sub-substrate 21 and the upper surface 10*a* of the main substrate 10 may be molded with resin.

Figure 12:
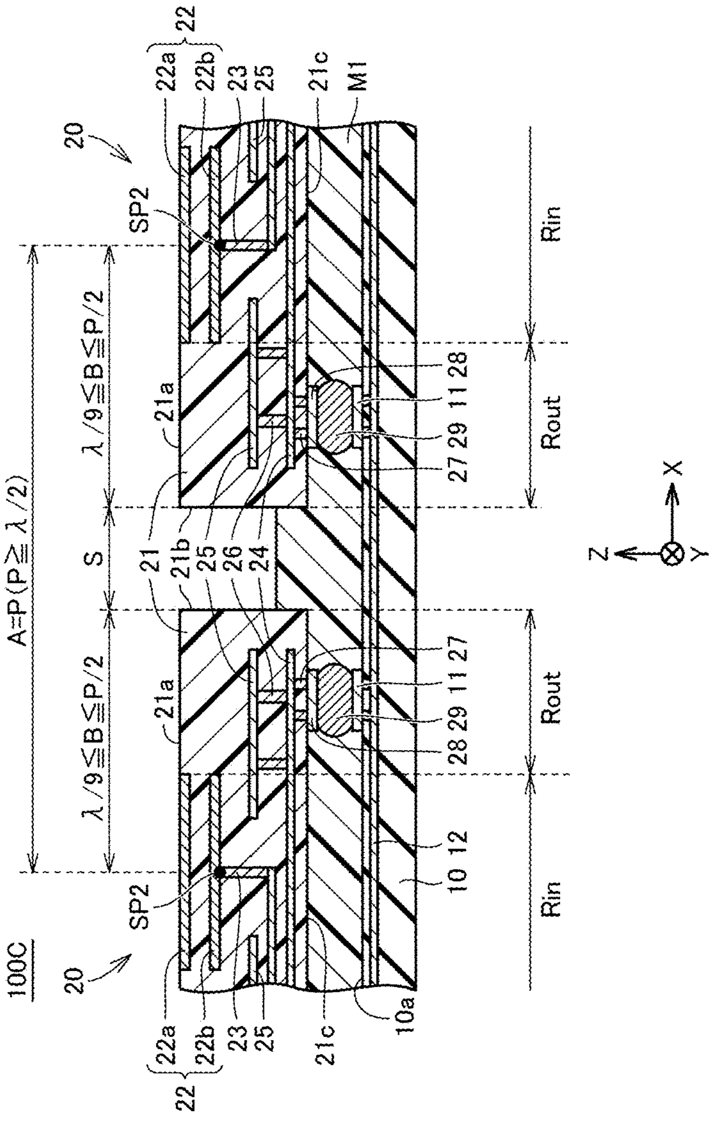
FIG. 12 is a sectional view (part 4) of an antenna module.

FIG. 12 is a sectional view of an antenna module 100C according to Modified Example 3. The sectional view of the antenna module 100C illustrated in FIG. 12 is obtained by adding a sealing resin M1 with respect to the sectional view of the antenna module 100 illustrated in FIG. 5. Since structure other than that is the same as that of antenna module 100 described above, a detailed description thereof will not be repeated here.

The sealing resin M1 is filled in between the lower surface 21*c* of the sub-substrate 21 and the upper surface 10*a* of the main substrate 10. Note that, FIG. 12 illustrates an example in which the sealing resin M1 is also filled into a part of the space S between the sub-substrates 21 adjacent to each other.

In this manner, the space between the lower surface 21*c* of the sub-substrate 21 and the upper surface 10*a* of the main substrate 10 may be molded with the sealing resin M1.

MODIFIED EXAMPLE 4

In the above-described embodiment, an example has been described in which a substrate on which the large number of antenna elements 22 are mounted is divided into the plurality of sub-substrates 21. However, the substrate on which the large number of antenna elements 22 are mounted is not necessarily limited to being divided and may be a single substrate.

Figure 13:
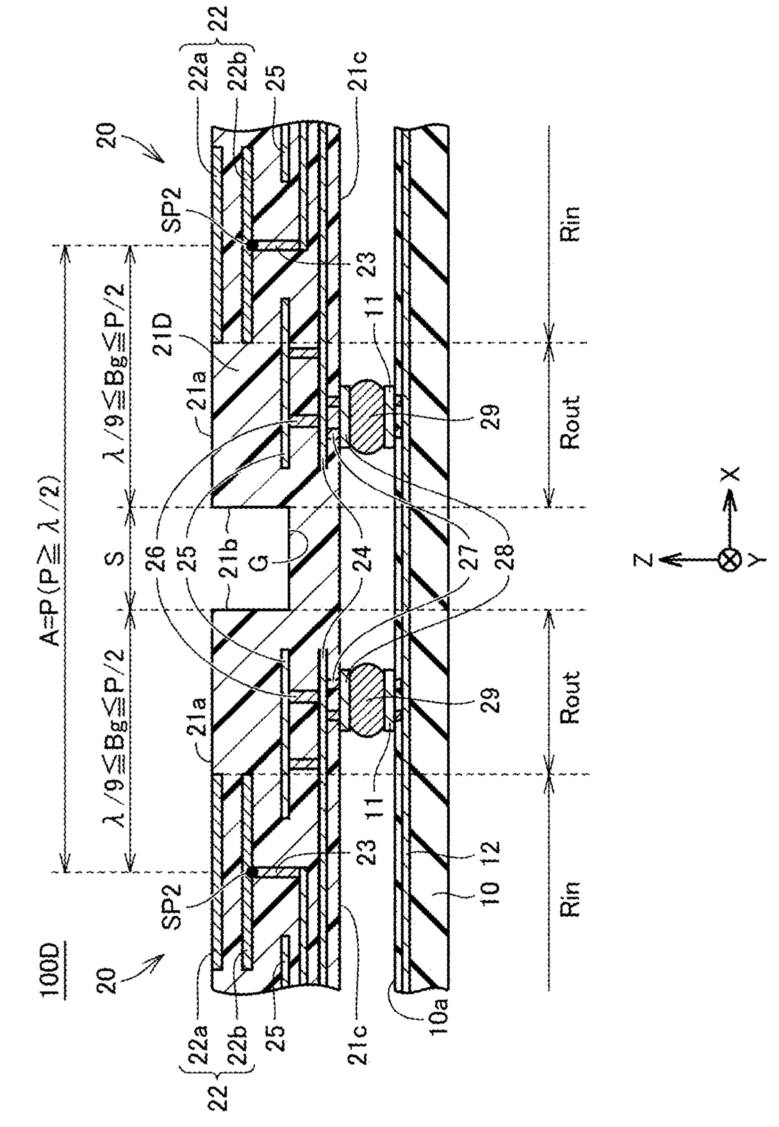
FIG. 13 is a sectional view (part 5) of an antenna module.

FIG. 13 is a sectional view of an antenna module 100D according to Modified Example 4. In the sectional view of the antenna module 100D illustrated in FIG. 13, while portions on a lower surface side of the space S illustrated in the sectional view of the antenna module 100 illustrated in FIG. 5 are linked to change the plurality of sub-substrates 21 to one sub-substrate 21D, a groove portion (slit) G is formed in a portion corresponding to the space S illustrated in FIG. 5 described above. Structure other than that is the same as that of the above-described antenna module 100.

That is, the antenna module 100D includes one sub-substrate 21D and a plurality of antenna elements 22 having a flat plate shape. The sub-substrate 21D has the upper surface 21*a*, the lower surface 21*c* facing the upper surface 21*a*, and the groove portion G recessed toward a side of the lower surface 21*c* of the upper surface 21*a*. Among the antenna elements 22, a distance Bg between a plane center of an antenna element arranged at a position adjacent to the groove portion G and the groove portion G is equal to or greater than $\lambda/9$ and equal to or less than P/2.

In such an antenna module 100D as well, a side lobe level of an entire array antenna can be suppressed, without characteristics of a single antenna element 22 deteriorating, similar to Embodiment described above.

In addition, deformation of the sub-substrate 21D due to heat or the like can be absorbed by the groove portion G in the sub-substrate 21D. Thus, even when the sub-substrate 21D is increased in size, it is possible to suppress warpage of the sub-substrate 21D.

MODIFIED EXAMPLE 5

Although the example in which the 16 antenna elements 22 are arranged in a 4×4 two-dimensional array on each sub-substrate 21 has been described in the above-described embodiment, the number of antenna elements 22 and the arrangement thereof on each sub-substrate are not limited thereto. For example, two of the antenna elements 22 may be one-dimensionally arranged 1×2 on each sub-substrate. By reducing the number of antenna elements 22 per sub-substrate and forming a larger space (an air layer) between the sub-substrates adjacent to each other, variations in beams radiated from the respective antenna elements 22 can be further suppressed.

Figure 14:
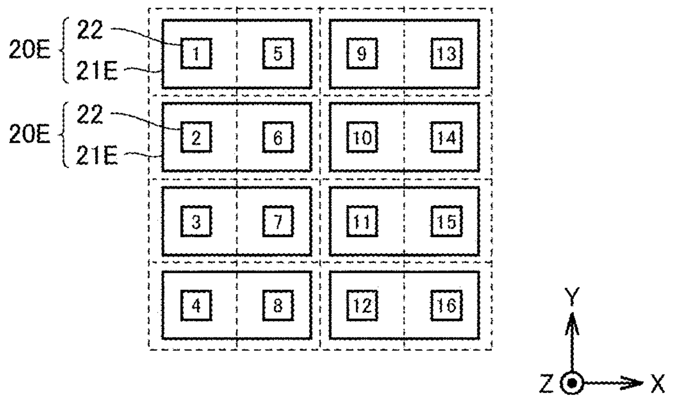
FIG. 14 is a plan view (part 2) of a sub-array antenna.

FIG. 14 is a plan view of a sub-array antenna 20E according to Modified Example 5. In each sub-array antenna 20E, two of the antenna elements 22 are one-dimensionally arranged 1×2 on an upper surface of the sub-substrate 21E, which has a rectangular shape. Eight of such sub-substrates 21E are arranged in a 4×2 two-dimensional array on a main substrate. A space (air layer) is formed between the sub-substrates 21E adjacent to each other. As described above, by arranging 16 of the antenna elements 22 separately on the eight sub-substrates 21E instead of collectively arranging the 16 antenna elements 22 on one sub-substrate, it is possible to arrange the 16 antenna elements 22 in a 4×4 two-dimensional array similarly to the sub-array antenna 20 illustrated in FIG. 3, to form a larger space between the adjacent sub-substrates 21E, thereby further suppressing variations in beams radiated from the respective antenna elements 22.

Note that, in FIG. 14, numbers 1 to 16 assigned to the 16 antenna elements 22, respectively, indicate the arrangement of the antenna elements 22.

The inventors of the present application confirmed the characteristics of the radio waves radiated from the respective antenna elements 22 by simulation, in each of the case illustrated in FIG. 3 (case where the 16 antenna elements 22 are collectively arranged on one sub-substrate 21), and the case illustrated in FIG. 14 (case where the 16 antenna elements 22 are separately arranged on the eight sub-substrates 21E).

Figure 15:
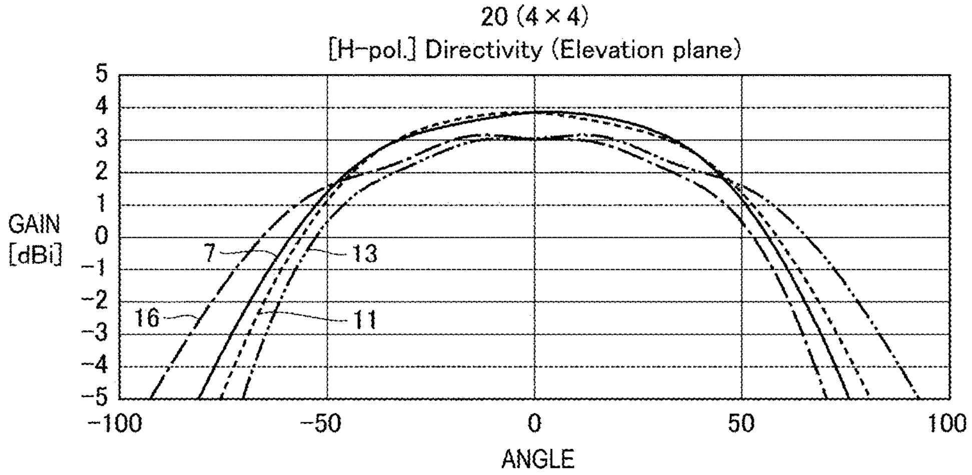
FIG. 15 is a diagram illustrating characteristics of a radio wave radiated from each antenna element illustrated in FIG. 3, with an X-axis direction as a polarization direction.
Figure 16:
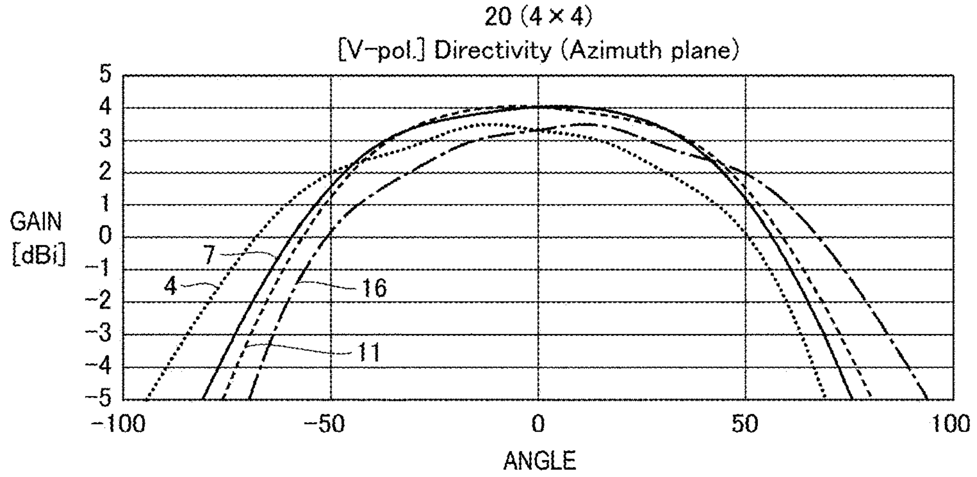
FIG. 16 is a diagram illustrating characteristics of a radio wave radiated from each antenna element illustrated in FIG. 3, with a Y-axis direction as a polarization direction.

FIG. 15 is a diagram illustrating characteristics of a radio wave radiated from each antenna element 22 illustrated in FIG. 3, with the X-axis direction as a polarization direction. FIG. 16 is a diagram illustrating characteristics of a radio wave radiated from each antenna element 22 illustrated in FIG. 3, with the Y-axis direction as a polarization direction.

Figure 17:
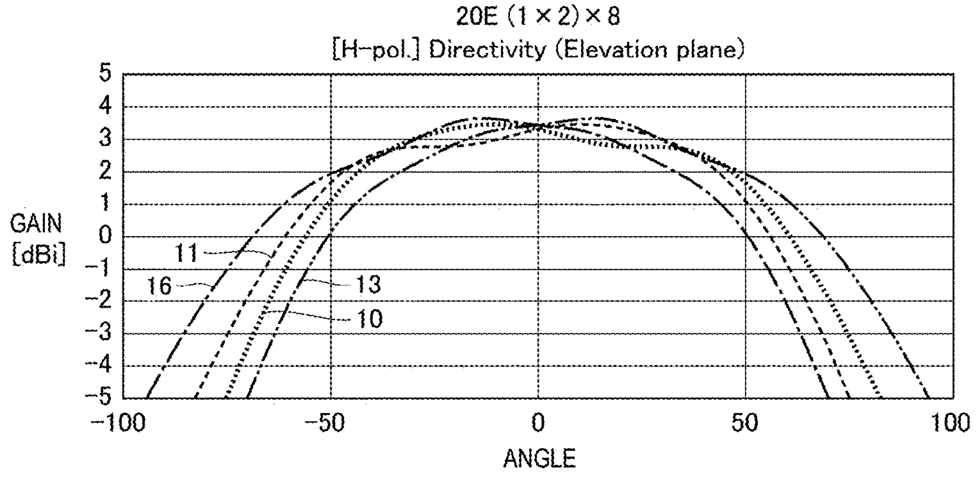
FIG. 17 is a diagram illustrating characteristics of a radio wave radiated from each antenna element illustrated in FIG. 14, with the X-axis direction as a polarization direction.
Figure 18:
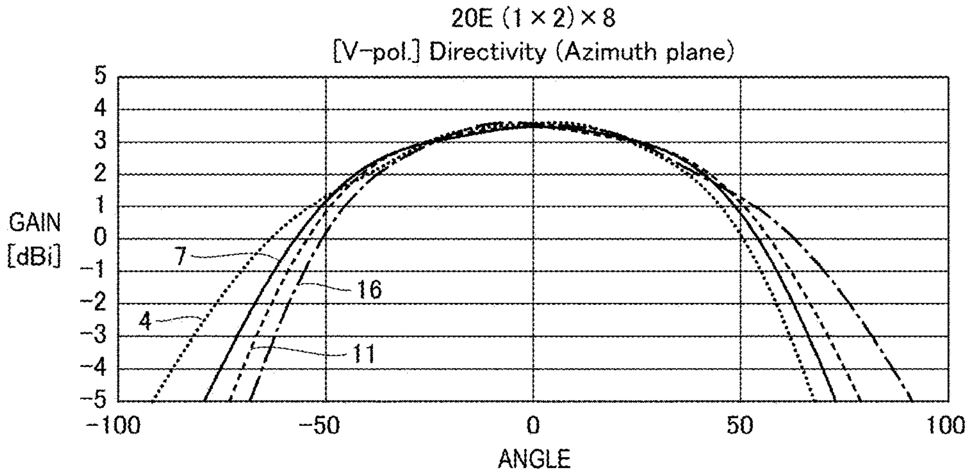
FIG. 18 is a diagram illustrating characteristics of a radio wave radiated from each antenna element illustrated in FIG. 14, with the Y-axis direction as a polarization direction.

FIG. 17 is a diagram illustrating characteristics of a radio wave radiated from each antenna element 22 illustrated in FIG. 14, with the X-axis direction as a polarization direction. FIG. 18 is a diagram illustrating characteristics of a radio wave radiated from each antenna element 22 illustrated in FIG. 14, with the Y-axis direction as a polarization direction.

Note that, in each of FIG. 15 to FIG. 18, a horizontal axis indicates a radiation angle of the radio wave when the Z-axis direction is defined as 0 degrees, and a vertical axis indicates gain of the radio wave. Further, numerical values assigned to characteristic curves illustrated in FIG. 15 to FIG. 18 correspond to the arrangement of the antenna elements 22 illustrated in FIG. 14 described above. That is, for example, the curve indicated by a one-dot chain line assigned with "16" in FIG. 16 and FIG. 17 indicates characteristics of the radio wave radiated from the antenna element 22 arranged at a position assigned with "16" in FIG. 14.

From simulation results illustrated in FIG. 15 and FIG. 16, it can be understood that, in the case illustrated in FIG. 3 (the case where the 16 antenna elements 22 are collectively arranged on one sub-substrate 21), variation in the gain of the radio wave radiated from each antenna element 22 is relatively large. On the other hand, from simulation results illustrated in FIG. 17 and FIG. 18, it can be understood that, in the case illustrated in FIG. 14 (the case where the 16 antenna elements 22 are separately arranged on the eight sub-substrates 21E), variation in the gain of the radio wave can be suppressed while variation in the radiation angle of the radio wave is substantially equivalent to that in the case illustrated in FIG. 3.

The embodiment disclosed herein is to be considered in all respects as illustrative and not restrictive. The scope of the present disclosure is defined not by the description of the above-described embodiments but by the claims, and is intended to include all modifications within the meaning and scope equivalent to the claims.

REFERENCE SIGNS LIST

1 COMMUNICATION DEVICE
10 MAIN SUBSTRATE
10*a*, 21*a* UPPER SURFACE
11, 28, 28B GROUND TERMINAL
12, 24, 25 GROUND ELECTRODE
20, 20A, 20B, 20E SUB-ARRAY ANTENNA
21, 21D, 21E SUB-SUBSTRATE
21*b* END SURFACE
21*c* LOWER SURFACE
22 ANTENNA ELEMENT
22*a* PARASITIC ELEMENT
22*b* FEEDING ELEMENT
23 FEED LINE
26, 27 VIA
29 SOLDER BUMP
100, 100A, 100B, 100C, 100D ANTENNA MODULE
111A to 111H, 113A to 113H, 117A, 117B SWITCH
112AR to 112DR LOW-NOISE AMPLIFIER
112AT to 112HT POWER AMPLIFIER
114A to 114H ATTENUATOR
115A to 115H PHASE-SHIFTER
116A, 116B SIGNAL MULTIPLEXER/DEMULTIPLEXER
118A, 118B MIXER
119A, 119B AMPLIFIER CIRCUIT
130, 130A to 130H FILTER DEVICE
SP1, SP2 FEEDING POINT

The invention claimed is:

1. A sub-array antenna, comprising:
a substrate; and
a plurality of antenna elements having a flat plate shape, wherein
the substrate has
a first surface,
a second surface facing the first surface, and
an end surface connecting the first surface and the second surface,
the plurality of antenna elements are aligned and arranged along the first surface at equal intervals on the first surface or in a layer between the first surface and the second surface, and
under a condition $\lambda$ is a wavelength of a radio wave in free space,
a distance between respective centers of two of the plurality of antenna elements adjacent to each other is equal to or greater than $\lambda/2$, and
a distance between a center of an outer antenna element, which is one of the plurality of antenna elements that is arranged at a position adjacent to the end surface, and the end surface is equal to or greater than $\lambda/9$ and equal to or less than half a distance between respective centers of two of the plurality of antenna elements adjacent to each other, wherein
the substrate further includes:
a ground terminal arranged on the second surface, and a ground electrode and a via formed between the layer, in which the plurality of antenna elements are arranged, and the second surface, the ground electrode is connected to the ground terminal, and at least a part of the ground electrode and the via is arranged in an outer region, the outer region being a region between the outer antenna element and the end surface.

2. The sub-array antenna according to claim 1, wherein the ground electrode is not exposed to the end surface.

3. The sub-array a ileum according to claim 2, wherein the ground terminal is arranged in a region inside the outer region of the substrate.

4. The sub-array antenna according to claim 2, wherein the second surface of the substrate is molded with resin.

5. The sub-array antenna according to claim 1, wherein the second surface of the substrate is molded with resin.

6. The sub-array antenna according to claim 1, wherein the ground terminal is arranged in a region inside the outer region of the substrate.

7. The sub-array antenna according to claim 1, wherein the second surface of the substrate is molded with resin.

8. The sub-array antenna according to claim 1, wherein each of the substrate and the plurality of antenna elements is formed in a substantially rectangular shape, each of the plurality of antenna elements is configured to radiate a radio wave with a first direction as a polarization direction and a radio wave with a second direction different from the first direction as a another polarization direction, the end surface includes a first end surface perpendicular to the first direction and a second end surface perpendicular to the second direction, and a distance between a center of an outer antenna element adjacent to the first end surface and the first end surface and a distance between a center of an outer antenna element adjacent to the second end surface and the second end surface are equal to or greater than λ/9 and equal to or less than half a distance between respective centers of two of the antenna elements adjacent to each other.

9. An array antenna comprising:

a main substrate, and a sub-array antenna according to claim 1 and another sub-array antenna according to claim 1 aligned and arranged adjacent to each other on the main substrate, wherein a distance between respective centers of outer antenna elements of the sub-array antenna and the another sub-array antenna, the outer antenna elements being adjacent to each other, is identical with a distance between respective centers of two of the antenna elements adjacent to each other in each of the sub-array antenna and the another sub-array antenna.

10. An antenna module, comprising:

the array antenna according to claim 9; and a feed circuit configured to supply a radio frequency signal to the plurality of antenna elements.

11. An antenna module, comprising:

the sub-array antenna according to claim 1; and a feed circuit configured to supply a radio frequency signal to the plurality of antenna elements.

12. An array antenna, comprising:

a substrate; and a plurality of antenna elements having a flat plate shape, wherein the substrate has a first surface, a second surface facing the first surface, and a groove portion recessed toward a side of the second surface from the first surface, the plurality of antenna elements are aligned and arranged along the first surface at equal intervals on the first surface or in a layer between the first surface and the second surface, and under a condition λ is a wavelength of a radio wave in free space, a distance between respective centers of two of the plurality of antenna elements adjacent to each other is equal to or greater than λ/2, and a distance between a center of an antenna element, which is one of the plurality of antenna elements and is arranged at a position adjacent to the groove portion, and the groove portion is equal to or greater than λ/9 and equal to or less than half a distance between respective centers of two of the plurality of antenna elements adjacent to each other, wherein the substrate further includes:

a ground terminal arranged on the second surface, and a ground electrode and a via formed between the layer, in which the plurality of antenna elements are arranged, and the second surface, the ground electrode is connected to the ground terminal, and at least a part of the ground electrode and the via is arranged in an outer region, the outer region being a region between the outer antenna element and the end surface.

13. The array antenna according to claim 12, wherein the ground electrode is not exposed to the end surface.

14. An antenna module, comprising:

the array antenna according to claim 12; and a feed circuit configured to supply a radio frequency signal to the plurality of antenna elements.

15. A communication device comprising:

an antenna module that includes the array antenna according to claim 12; and a feed circuit configured to supply a radio frequency signal to the plurality of antenna elements.

16. A sub-array antenna, comprising:

a substrate; and a plurality of antenna elements having a flat plate shape, wherein the substrate has a first surface, a second surface facing the first surface, and an end surface connecting the first surface and the second surface, the plurality of antenna elements are aligned and arranged along the first surface at equal intervals on the first surface or in a layer between the first surface and the second surface, and under a condition a distance between respective centers of two of the antenna elements adjacent to each other is P, a distance between a center of an outer antenna element, which is one of the plurality of antenna elements and is arranged at a position adjacent to the end surface, and the end surface is equal to or greater than 2/9 of P and equal to or less than half of P, wherein the substrate further includes:

a around terminal arranged on the second surface, and a ground electrode and a via formed between the layer, in which the plurality of antenna elements are arranged, and the second surface, the ground electrode is connected to the ground terminal, and at least a part of the ground electrode and the via is arranged in an outer region, the outer region being a region between the outer antenna element and the end surface.

* * * * *